United States Patent [19]

Shank

[11] 4,426,443

[45] Jan. 17, 1984

[54] PREPARATION OF HYDROLYZED COLLAGEN-CONTAINING PRODUCTS FROM NON-GELLED, LIQUID HYDROLYZED COLLAGEN CONCENTRATE AND GELLED PRODUCTS PREPARED THEREFROM

[75] Inventor: Joseph L. Shank, Matteson, Ill.

[73] Assignee: DynaGel, Incorporated, Calumet City, Ill.

[21] Appl. No.: 295,796

[22] Filed: Aug. 27, 1981

[51] Int. Cl.³ .................... B05D 3/02; B05D 7/00; C08L 89/06
[52] U.S. Cl. .................................. 430/538; 106/155; 260/112 R; 426/571; 426/576; 427/220; 427/384; 430/539
[58] Field of Search ................ 106/155; 427/220, 384; 430/538, 539; 260/112 R; 426/576, 571

[56] References Cited

U.S. PATENT DOCUMENTS

| | | | |
|---|---|---|---|
| 3,443,261 | 5/1969 | Battista et al. | 106/155 |
| 3,619,263 | 11/1971 | Bremer et al. | 427/220 |
| 4,148,941 | 4/1979 | Pape et al. | 427/220 |

Primary Examiner—Michael R. Lusignan
Attorney, Agent, or Firm—Dressler, Goldsmith, Shore, Sutker & Milnamow, Ltd.

[57] ABSTRACT

A method of preparing a gelled product from an ungelled aqueous hydrolyzed collagen, such as gelatin or glue, concentrate containing 10–60 weight percent hydrolyzed collagen and a lyotropic agent is disclosed. The concentrate has a hydrolyzed collagen-to-lyotropic agent weight ratio of 1:0 of 1:0.1 to about 1:4.5, a pH value of 2.5–7 and gels at less than 20° C. On dilution with water to a hydrolyzed collagen concentration of about 2 weight percent while substantially maintaining the pH value of the concentrate, the diluted composition gels at a temperature above that of the concentrate. Specific concentrates, food products, industrial applications and methods for using the concentrates are disclosed.

13 Claims, 5 Drawing Figures

GEL-SET TEMPERATURES OF GELATIN CONCENTRATES AND DILUTED COMPOSITIONS PREPARED THEREFROM

| COMPOSITION | % GELATIN | % LYOTROPE | G:L |
|---|---|---|---|
| A | 28 | — | — |
| A/10 | 2.8 | — | — |
| B | 28 | 20 | 1:0.7 |
| B/10 | 2.8 | 2 | 1:0.7 |
| C | 28 | 20 | 1:0.7 |
| C/10 | 2.8 | 2 | 1:0.7 |
| D | 32 | 15.1 | 1:0.4 |
| D/10 | 3.2 | 1.51 | 1:0.4 |
| E | 12.8 | 30.1 | 1:2.3 |
| E/10 | 1.28 | 3.01 | 1:2.3 |
| F | 12.7 | 49.2 | 1:3.9 |
| F/10 | 1.27 | 4.92 | 1:3.9 |

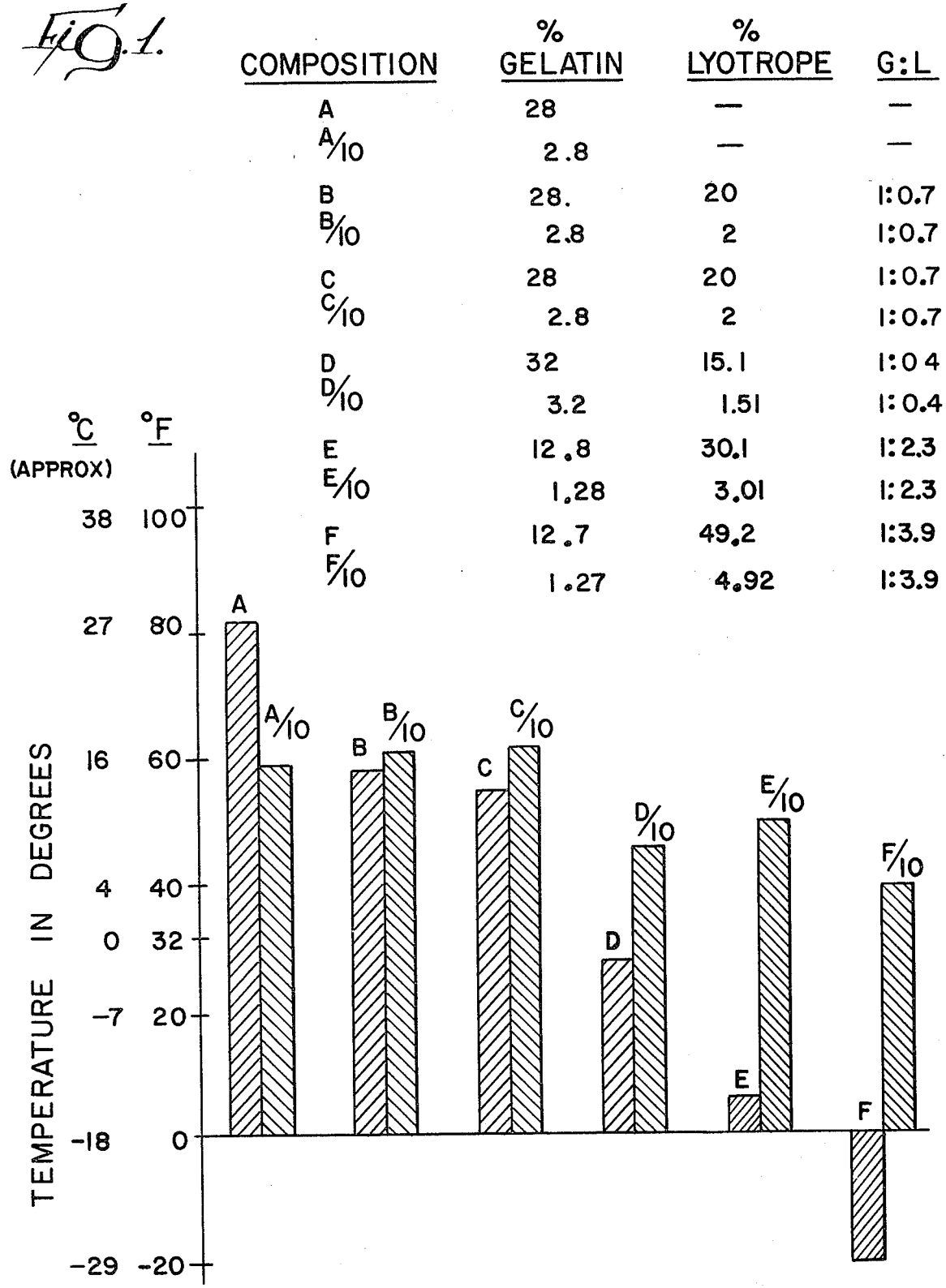
Fig. 1. GEL-SET TEMPERATURES OF GELATIN CONCENTRATES AND DILUTED COMPOSITIONS PREPARED THEREFROM

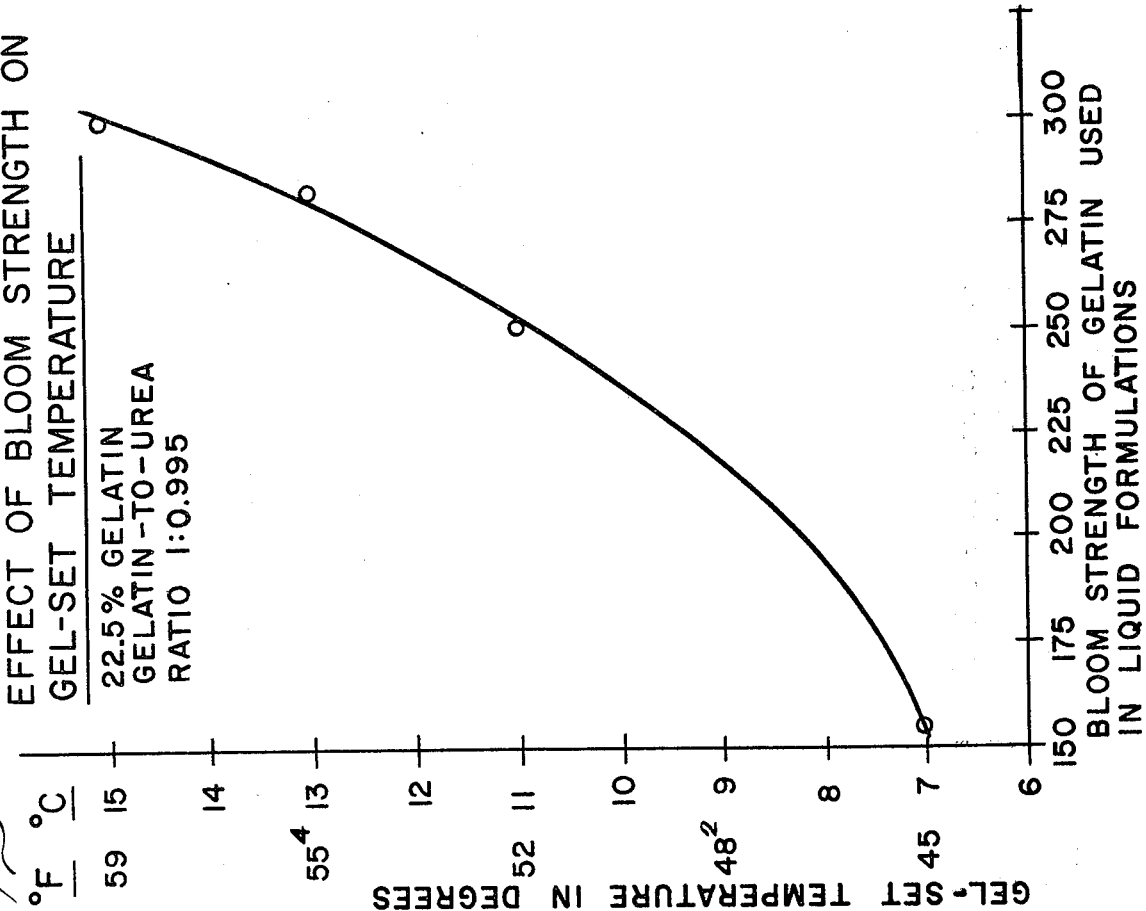
FIG. 3. EFFECT OF BLOOM STRENGTH ON GEL-SET TEMPERATURE
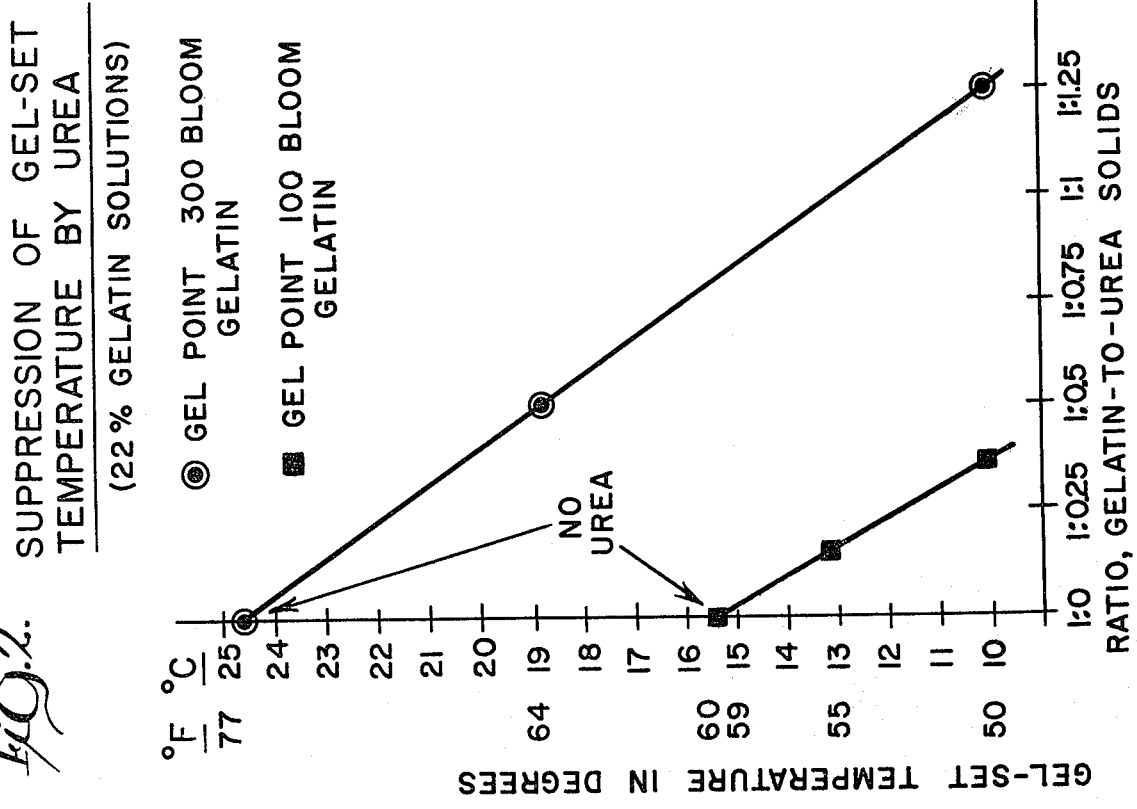
FIG. 2. SUPPRESSION OF GEL-SET TEMPERATURE BY UREA

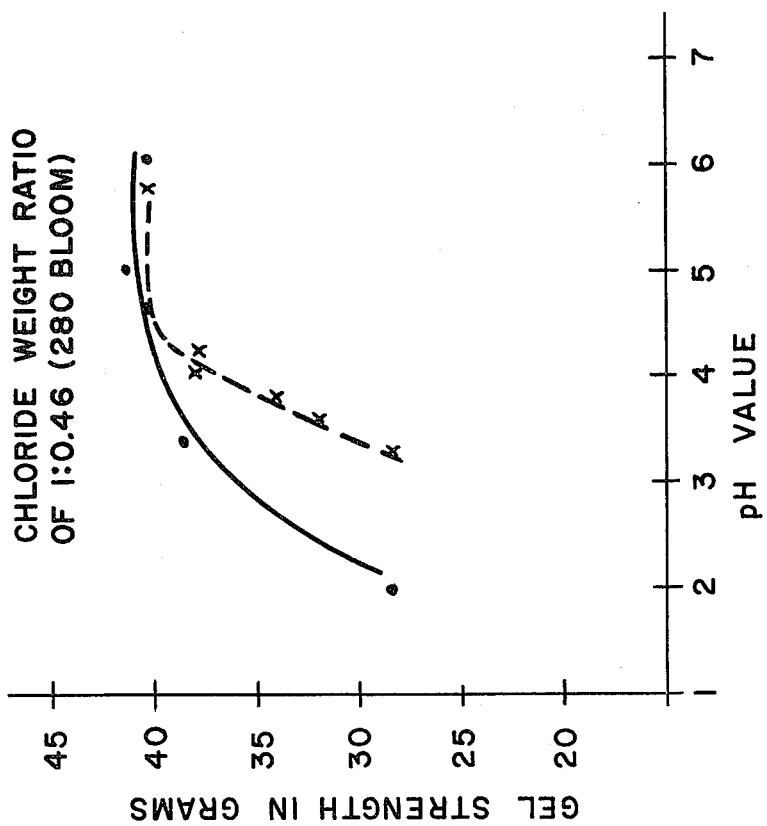
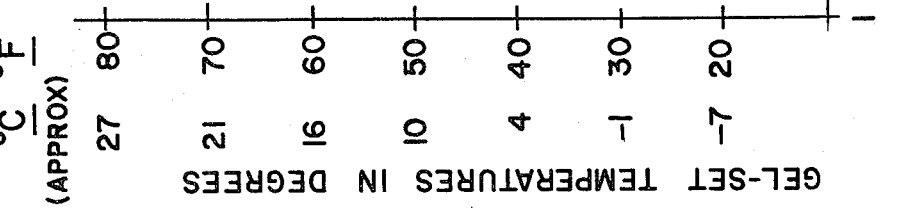

PREPARATION OF HYDROLYZED COLLAGEN-CONTAINING PRODUCTS FROM NON-GELLED, LIQUID HYDROLYZED COLLAGEN CONCENTRATE AND GELLED PRODUCTS PREPARED THEREFROM

DESCRIPTION

1. Technical Field

This invention relates to hydrolyzed collagen compositions, and particularly to products which are prepared from non-gelled, liquid, aqueous gelatin and glue concentrates.

2. Background Art

Gelatin and glue are names for the proteinaceous materials derived from collagen by hydrolytic action. Gelatin and glue are similar chemically, and each can generally be replaced in a composition for the other on an equal weight basis. However, gelatin is the name given to the protein produced at a purity suitable for edible consumption, while glue is the name given to the protein produced at a purity suitable only for non-food uses.

The phrase "hydrolyzed collagen" will be used herein as a collective name for both gelatin and glue. Since gelatin can generally replace glue for non-food uses, and glue should not be used to replace gelatin in food uses, the collective name "hydrolyzed collagen" is used hereinafter where either gelatin or glue can be used, while the word "gelatin" will be used where only the edible protein is intended.

Hydrolyzed collagen is soluble or dispersible in hot water, and can swell to take-up about 5–10 times its own weight of water to form a gel. It is useful for the preparation of adhesives, food products, such as desserts, photochemical tissue for rotogravure printing, subbings for photographic film, sizing for textiles and papers, and the like. With the exception of its use in adhesives, where hydrolyzed collagen may comprise about 30 to about 50 weight percent of the product composition, hydrolyzed collagen is typically used at a concentration of about 0.25 to about 25 weight percent of an aqueous composition. In some of these uses, the hydrolyzed collagen composition is used in relatively large, gelled blocks, as in a dessert, while in other uses, it is utilized as an extremely thin, gelled film, as in a photographic subbing. When used in adhesives, the hydrolyzed collagen composition is normally a liquid at the time of ultimate use.

Gelled food products, such as desserts, typically contain about 1 to about 3.5 weight percent gelatin along with various other ingredients such as one or more food acids for tartness, sweetener and flavorant. Non-dessert gelled food products, such as aspics, also contain about 1 to about 3.5 weight percent gelatin with flavor containing materials, such as tomato juice, beef broth, or clam broth, and usually common table salt. These food products typically gel at temperatures less than about 70° F. (about 20° C.), and are usually refrigerated at temperatures of about 50°–55° F. (about 10°–13° C.) to initiate gelation. Other gelatin-containing food products such as marshmallows, head cheese, canned hams and ice milks generally contain from about 0.25 to about 15 weight percent gelatin, based upon the weight of the water present, along with the usually used flavorants such as sweeteners and spices.

A difficulty arising from the use of hydrolyzed collagen compositions stems from the fact that dry hydrolyzed collagen is not readily soluble in cold or tepid water. Rather, the dry hydrolyzed collagen must be heated and agitated with water to a temperature of about 50°–60° C. so that it will dissolve. On an industrial scale, such dissolution requires a large energy input and large pieces of equipment to make relatively dilute compositions.

Concentrated hydrolyzed collagen solutions containing about 10 to about 60 weight percent hydrolyzed collagen can be made, but these solutions gel at temperatures above ambient room temperature, and once gelled, they must be reheated and agitated during the dilution step as gelled hydrolyzed collagen compositions are not soluble in cold or tepid water. It would therefore be advantageous if a storage stable, readily dilutable, concentrated, liquid hydrolyzed collagen solution could be prepared which would need no heating step for its dilution and consequently also need less agitation and cooling to be in a usable condition.

Another difficulty which arises from the uses of hydrolyzed collagen stems from the fact that its proteinaceous character makes it an ideal substrate for unwanted bacterial growth. Bacterial growth can be combatted by refrigeration or suitable packaging of gelatin-containing food products. However, for non-food products, this problem is usually solved by the incorporation into the product of bacteriostats or bactericides; and such materials can be unduly expensive and require an added material to be purchased, stored and properly added to the compositions. Consequently, it would be advantageous if hydrolyzed collagen compositions for non-food products could provide their own bacteriostasis.

The use of liquefying agents or lyotropic agents in adhesives containing relatively high concentrations of hydrolyzed collagen; i.e., about 30–50 weight percent, has been known for sometime. For example, U.S. Pat. Nos. 1,394,654, 1,844,679, 1,873,580, 1,950,483, 2,048,499, 2,126,305 and 2,658,001 teach that thiourea, urea, biuret, alkali metal nitrates, dextrines, infusorial or diatomaceous earth, alkaline earth salicylates, ethyl alcohol, glycerol, furfuryl or tetrahydrofurfuryl alcohols, 2-methoxy methanol, thiocyanate salts and the like are useful to lower the gelling temperature of various hydrolyzed collagen-containing compositions. In addition, U.S. Pat. No. 2,413,815, states that boiling a gelatin solution with phosphoric acid at a composition pH value of less than 5.7, followed by neutralization with calcium carbonate to a pH value between 5.7 and 5.9 and filtration, leads to a composition which may contain more than 20 weight percent gelatin and still remain liquid down to the temperature at which the solvent congeals.

A more recent patent, U.S. Pat. No. 4,224,353, acknowledging the known lyotropic effect of acid pH values upon aqueous gelatin solutions, teaches that gellable aqueous gelatin-containing dessert starter compositions can be prepared using an acid as the lyotropic agent. The syrups of that invention are said to be suitably prepared containing from about 5 to 40 percent gelatin, from about 5 to about 40 percent acid and from about 20 to 90 percent water, with the acid present at about 30–200 percent of the weight of the gelatin. The dessert starter compositions gel to form the final dessert products when they are mixed with sufficient buffer to raise the pH of the dessert composition to about 3.6 to 4.6. Water is also be added to achieve the desired gelatin concentration of ingredients.

The compositions of the above patent are, however, said to deteriorate on storage at room temperature due to hydrolysis of the gelatin protein under acid conditions. Those gelatin-containing syrups are therefore preferably stored and sold in a refrigerated or frozen form along with the neutralizing buffer salts.

Aside from the lack of convenience of the products of the above patent due to their storage under refrigerated conditions, the food product made using the proportions of ingredients set out in its sole Example was found to have a metallic taste. It is presumed that the taste so found arose from the relatively high amount of buffer salt needed to raise the composition to the proper pH value for gelling. That product also contains a relatively high sugar content, also presumably to help mask the metallic flavor.

None of the above-described art teaches or suggests that room temperature storage stable ungelled hydrolyzed collagen-containing concentrates can be prepared using a non-acid lyotrope, and then diluted with water to form gelled products which gel at temperatures above the gelling temperature of the concentrate, and at temperatures similar to product compositions containing the same amount of hydrolyzed collagen and no lyotropic agent, as is taught hereinbelow.

BRIEF SUMMARY OF THE INVENTION

A method of preparing a product containing gelled, hydrolyzed collagen is disclosed in which an ungelled aqueous concentrate having a gel-set temperature less than about 20° C. is first provided. This ungelled aqueous concentrate contains about 10 to about 60 weight percent hydrolyzed collagen, and a non-acid lyotropic agent, such as urea or calcium chloride. Its pH value can range from about 2.5 to about 7, the lower values, when present, being attained through materials other than lyotropic agent. The weight ratio of the hydrolyzed collagen-to-lyotropic agent is about 1:0.1 to about 1:4.5. The concentrates of this invention have the property whereby dilution with water to a hydrolyzed collagen concentration of about 2 weight percent of the total composition, while maintaining substantially the pH value of the concentrate, produces a diluted composition having a gel-set temperature higher than that of the concentrate.

A first volume of the hydrolyzed collagen concentrate so provided is diluted with at least an equal volume of an aqueous composition to provide a diluted aqueous composition which has a hydrolyzed collagen concentration of from about 0.25 to about 25 weight percent, and gels when the diluted composition is held at a temperature not higher than its gel-set temperature for a period of time sufficient to permit the hydrolyzed collagen therein to gel.

A novel aqueous comestible product concentrate and method of its preparation are also disclosed. This concentrate is ungelled at ambient temperatures and has a gel-set temperature of less than about 20° C. It contains about 10 to about 30 weight percent gelatin, an edible, non-acid lyotropic agent, such as urea, and at least one flavorant or other ingredient or component, and has a pH value of about 3.5 to about 5.5. The ratio of gelatin-to-non-acid, edible lyotropic agent in the concentrate is about 1:0.3 to about 1:1.5. Upon dilution of a first volume of the concentrate with at least an equal volume of an aqueous composition to a gelatin concentration of from about 0.25 to about 15 weight percent of the composition and maintaining a pH value of about 3.5 to about 5.5, the resulting diluted composition has a gel-set temperature higher than that of the concentrate from which it is prepared.

A novel method for coating a substrate is also disclosed. According to this method, an ungelled aqueous hydrolyzed collagen concentrate containing from about 10 to about 60 weight percent hydrolyzed collagen and a non-acid lyotropic agent, present at a hydrolyzed collagen-to-lyotropic agent weight ratio of from about 1:0.1 to about 1:4.5 is first provided. This concentrate has a gel-set temperature less than about 20° C. and a pH value of between about 2.5 and about 7. A first volume of the concentrate is then diluted with at least an equal volume of an aqueous composition to form a diluted composition having a hydrolyzed collagen concentration of from about 0.25 to about 25 weight percent. The diluted composition is applied before gelling, as by spraying, over the surface of a substrate to form a coating thereon. The diluted composition whose gel-set temperature is above about 20° C. is then allowed to form a gel which can subsequently dehydrate to form a film over the substrate.

One of the several advantages and benefits of the instant invention is that a concentrated hydrolyzed collagen-containing composition is prepared in ungelled, dilutable form which can be diluted with water without heating to provide hydrolyzed collagen at a concentration which is suitable for gelled products. This permits quick and easy usage.

Another advantage of the instant invention is that while the concentrate does not gel at normal temperatures, once the concentrate is diluted to a hydrolyzed collagen concentration of about 0.25 to about 25 weight percent, the diluted composition gels at a temperature similar to that of a composition containing the same amount of hydrolyzed collagen of the same Bloom or jelly value but containing no lyotropic agent.

Another benefit of the concentrates of this invention is that they can be stored for months to more than a year at room temperature without appreciable hydrolysis of the hydrolyzed collagen or detriment to the resulting gelled product.

Yet another benefit of this invention is that it permits use of aqueous liquid hydrolyzed collagen concentrates at temperatures below the freezing point of water which form gelled products at less than 0° C. upon dilution.

Still another advantage of the instant invention is that additional ingredients may not be necessary to provide needed bacteriostasis, thereby eliminating the need to buy, store and add an extra bacteriostatic ingredient.

Several other benefits and advantages of the instant invention will become manifest to those skilled in the art from the detailed description which follows.

BRIEF DESCRIPTION OF THE DRAWINGS

In the drawings, forming a portion of the disclosure of this invention;

FIG. 1 is a graph showing a comparison of gel-set temperatures of concentrated and diluted (to one tenth) aqueous compositions containing gelatin alone or containing various percentages of gelatin of the same Bloom value and various percentages of a lyotropic agent;

FIG. 2 is a graph showing a plot of gel-set temperatures for aqueous compositions containing 22 weight percent gelatin and varying amounts of urea, the abscissa being in units of the weight ratio of gelatin-to-urea;

FIG. 3 is a graph showing a plot of gel-set temperatures for a constant amount of gelatin, and constant gelatin-to-urea weight ratio versus the Bloom value of the gelatin used to prepare the concentrate;

FIG. 4 is a graph showing the effect of pH value on gel-set temperature for gelatin concentrates of this invention; and FIG. 5 is a graph showing the effect of pH value on the gel strength for concentrates of this invention which have been diluted to form gelled products.

DETAILED DESCRIPTION OF THE INVENTION

The present invention relates to a method of preparing products from liquid, aqueous hydrolyzed collagen concentrates which remain fluid at ambient temperature, as well as relating to the concentrates themselves. Upon merely diluting the concentrates with at least an equal volume of water, the resulting diluted compositions form firm gels at ambient temperatures although gel rigidity is improved by refrigeration. While the diluted compositions, themselves, will form firm gels at ambient temperatures, the products containing the diluted compositions need not be gelled, as is discussed herein below.

It is well known that increasing the hydrolyzed collagen concentration in an aqueous composition causes the composition to gel more easily (i.e. raises the temperature at which the gel will form). It is equally well known that lowering the hydrolyzed collagen concentration makes the composition more difficult to gel (i.e. decreases the gelling temperature). This is shown in gelatin Compositions A and A/10 of FIG. 1.

The method of the present invention runs contrary to these usually observed phenomena in that the diluted hydrolyzed collagen solutions of this invention generally gel more easily, or at higher temperatures than do the hydrolyzed collagen concentrates from which they are made. This is shown in the comparisons in FIG. 1 of gelatin Compositions B–F with their diluted (tenfold) counterparts B/10–F/10.

More specifically, gel-set temperatures for five hydrolyzed collagen concentrates useful herein are shown in the graph of FIG. 1 for gelatin Compositions B, C, D, E and F. The gel-set temperatures of the diluted compositions (one volume to ten volumes) prepared from the above concentrations, Compositions B/10, C/10, D/10, E/10 and F/10, respectively are also illustrated. The gelatin and lyotrope (urea) concentrations are listed for each solution as is the weight ratio of gelatin-to-urea (G:U).

For purposes of comparison in FIG. 1, the gel-set temperature of an aqueous gelatin concentrate (Composition A) having the same amount of gelatin as concentrates B and C and no lyotropic agent is shown, as is the gel-set temperature of the diluted composition (A/10) made therefrom and having the same gelatin concentration as compositions B/10 and C/10. The gelatin used for each composition of FIG. 1 had a Bloom value of 280.

The hydrolyzed collagen concentrates of this invention gel at temperatures lower than normally expected for compositions containing an equal amount of hydrolyzed collagen because they contain a non-acid lyotropic agent which prevents or retards gelation. While it is not desired to be bound by any particular theory or mechanism, it is believed that when the hydrolyzed collagen concentrate is diluted with water, the gelation retarding effect of the non-acid lyotropic agent decreases more rapidly than does the gel retardation effect of lowered hydrolyzed collagen concentration. The usual result of these believed different rates of decreasing effects on gelling temperature is that once the concentration of hydrolyzed collagen is reached which is desired for a gelled product, the gel retarding effect of the lyotropic agent is minimal and the product gels at a temperature near that expected for the hydrolyzed collagen alone.

The diluted compositions prepared in accordance with this invention usually, and preferably, gel at higher temperatures than do the concentrates from which they are prepared. Under some circumstances, however, the rise in gelling temperature usually observed in this invention can be overwhelmed by other phenomena and the diluted composition gels at a temperature equal to or below the gel-set temperature (discussed hereinafter) of the concentrate from which it is prepared. One such circumstance can occur when the concentrate is at a relatively high pH value, e.g. about pH 6–7, and the diluted product has a relatively low pH value, such as about 4 or below.

In the exceptional situations in which the diluted product has a gel-set temperature equal to or greater than the gel-set temperature of the concentrate from which it is made, the system is nevertheless within the ambit of this invention provided that either (1) the diluted composition has a gel-set temperature higher than about 10° C. (about 50° F.), or (2) the concentrate when diluted with water (rather than with an acid-containing aqueous composition) to a hydrolyzed collagen concentration of about 2 weight percent of the total composition, while maintaining substantially the pH value of the concentrate (e.g. within about 0.5 pH units) produces a diluted composition having a higher gel-set temperature than that of the concentrate from which it is prepared. This latter test is particularly useful in the above-discussed circumstance when the concentrate has a relatively high pH value and the pH value of the diluted composition is relatively low.

For ease of understanding, and clarity, the remainder of the discussion herein will deal with the preferred compositions wherein the diluted composition has a gel-set temperature above that of the concentrate from which it is prepared.

While the hydrolyzed collagen concentrates of this invention are normally liquid at ambient room temperatures, storage or shipment at below room temperatures, as during winter shipment, can cause the concentrates to gel. Should gelation of these concentrates occur, storage at or above ambient room temperature will generally cause the gelled concentrates to reliquify and return to their usable condition because there is usually only a difference of a few degrees, e.g. about 3° C., between their gelling and melting temperatures.

According to the instant invention, aqueous concentrates containing from about 10 to about 60 weight percent hydrolyzed collagen are prepared and utilized. Preferably, and necessarily with hydrolyzed collagens of high gel strength (Bloom or jelly value), the concentrates of this invention contain from about 10 to about 40 weight percent hydrolyzed collagen. The amount of hydrolyzed collagen is calculated on the basis of the solids content of the hydrolyzed collagen material used;

i.e. as the amount of acid salt of the protein or as the amount of free protein used. These concentrates are liquid and ungelled at ambient temperatures, rather than being gelled; i.e., the concentrates have gel-set temperatures which are preferably less than about 20° C., and are more preferably less than about 15° C.

As used herein, the "gel-set temperature" is that temperature at which a composition containing hydrolyzed collagen will gel within the time required for all of the material to reach said temperature. This temperature is measured by slowly cooling an aqueous, hydrolyzed collagen-containing solution containing a thermometer and observing the temperature at which gelation occurs.

It is pointed out that the gel-set temperature and the temperature at which a gelled composition will reliquify or melt are usually quite different, with the melting temperature being higher. The gel-set temperatures of the concentrates useful herein usually are within about 5° F. (about 3° C.) of the melting temperatures, while differences between gel-set and liquification temperatures of about 15°–30° F. (about 8°–17° C.) are not uncommon for the diluted compositions made in accordance with this invention and useful herein. Thus, even where dilution produces a relatively small rise in gel-set temperature over that of the concentrate, the difference in melting temperatures between a gelled concentrate and its diluted composition is usually larger. This larger separation of melting temperatures makes this invention useful even when the gel-set temperature of the diluted composition is raised slightly because if a concentrate happens to gel due to low temperature exposure, it will return to a liquid state easily by sufficient exposure to a temperature only a few degrees above its gel-set temperature, while the diluted composition, having a more temperature stable gel form, will generally remain in the gelled state with the same exposure to a temperature above its gel-set temperature.

The hydrolyzed collagen useful herein can be obtained from one or more animal sources as is known in the art. Collagen hydrolysis is typically carried out in hot water under acidic or neutral conditions from either acid or base cured collagen-containing sources. The hydrolyzed product is typically provided as the corresponding acid salt, e.g. hydrochloride, or hydrosulfate, although salt-free, deionized, materials are also available. As the method and products of this invention can be directed toward human consumption, the food grade material, gelatin, is used for edible compositions.

Bloom and jelly strengths or values are properties of the hydrolyzed collagens which relate to the gel strength or firmness which a particular hydrolyzed collagen produces under standardized conditions. Bloom values are used for gelatins and jelly values are used for glues.

The Bloom strength or value for gelatin and jelly value for glue are based upon the force in grams required to cause a standardized piston to move through a standardized, gelled hydrolyzed collagen sample, and are used for rating the strength of gels. Gel strength is measured in commercially available machines called Bloom Gelometers. Higher Bloom or jelly values indicate higher gel strengths and higher gelling temperatures for a selected amount of hydrolyzed collagen.

A gelatin composition for measuring Bloom strength contains 7.5 grams of gelatin dissolved in 105 grams of water. The gelatin solution is allowed to gel and is kept at 50° F. (10° C.) for 17 hours prior to making the Bloom strength determination.

Jelly values for glues are measured using the same apparatus and time and temperature conditions as Bloom values, except that 15 grams of dried glue are dissolved in 105 grams of water. Jelly values are thus determined for solutions containing about twice the amount of hydrolyzed collagen solids that are used to determine Bloom values (12.5 percent versus 6.67 percent, respectively). Consequently, for compositions prepared from a glue and a gelatin which are similar, the jelly value of the glue used is more than about two times the Bloom value of the gelatin.

The Bloom value of the gelatin useful herein is preferably from about 100 to about 350, and more preferably from about 200 and about 300. Jelly value for the glues useful in preparing the concentrates and diluted compositions of this invention is preferably from about 200 to about 700, and more preferably from about 400 to about 600.

Since Bloom and jelly strengths or values are measured at specific solids concentrations, and the various diluted compositions described herein are generally not at those required solids concentrations, the measures of gel firmness reported herein for diluted compositions are not in Bloom or jelly values. Rather, gel firmness values are given in terms of "gel strength" which is the number of grams required to move the piston of a Bloom Gelometer through the gelled, diluted composition being measured, using the same time and temperature conditions used for measuring Bloom or jelly values.

It is known that a series of gelled products having a constant gel strength can be prepared from hydrolyzed collagens of differing Bloom or jelly values by suitably adjusting the concentrations of the hydrolyzed collagen used for the composition, and the pH value of each composition. For example, use of one amount of a gelatin having a high Bloom value can produce a gelled product whose gel strength is the same as a gelled product prepared by using a higher concentration of a gelatin that has a lower Bloom value. This effect is illustrated in part by the gel strength versus pH value plots of FIG. 5 wherein gelatin having Bloom values of 310 and 280 were used, the ordinate of the plots of FIG. 5 being in gel strength units.

A non-acid lyotropic agent (lyotrope) also constitutes a portion of the concentrates of this invention. Those lyotropes useful herein are non-acids, that is, when dissolved in distilled water having a pH value of 7, the resulting solution is substantially neutral, e.g. the solution has a pH of about 6 to about 8, rather than being more strongly acidic as would be the case when a food acid is used as the lyotrope as is disclosed in U.S. Pat. No. 4,224,353. Thus, although the compositions of the present invention have pH values which are preferably less than about 7, the lyotropes used herein do not contribute substantially to pH value of the compositions.

Non-acid lyotropes useful herein include but are not limited to urea, calcium chloride, lithium bromide, biuret, thiourea, and potassium thiocyanate; urea and calcium chloride being particularly preferred. A single lyotropic agent can be used, or mixtures of lyotropic agents can be used. When the concentrates of this invention are utilized for the preparation of comestible products, such as foods or capsules for medicaments, edible non-acid lyotropes, such as urea or calcium chloride, are used. Urea is the preferred lyotrope for use in products where taste is a factor because urea is substantially tasteless in such uses. Urea is also a natural metabolic product which is normally excreted through the kindeys.

Comestible products include those which are in the form of gels, such as flavored gelatin desserts and aspics, and those in which the gelatin is gelled but the product as a whole is not in the form of a gel, such as ice milk. My invention relating to gelled food products, such as aspics and desserts, is the subject of my co-assigned patent application, Ser. No. 295,795, filed concurrently herewith, now U.S. Pat. No. 4,341,810, patented July 27, 1982.

The ratio of hydrolyzed collagen-to-lyotrope (HC:L) in the concentrate has an effect on the gel-set temperature of both the concentrate and the diluted composition prepared therefrom. If too little lyotrope is used, the gel-set temperature of the concentrate will not be low enough, and the concentrate may gel at temperatures above 20° C. If too much lyotrope is used, the diluted composition having the prescribed hydrolyzed collagen concentration may not gel at the temperature desired for the product.

The weight of hydrolyzed collagen to that of non-acid lyotrope preferably is in a ratio of about 1:0.1 to about 1:4.5. It is stressed that the weight ratio of hydrolyzed collagen-to-lyotrope does not change by mere dilution with water and typically remains constant in both the concentrate and diluted composition, but the lyotropic effect is noted substantially only in the concentrate. The constancy of the hydrolyzed collagen-to-lyotrope weight ratio herein is contrasted with the disclosures of U.S. Pat. No. 4,224,353 wherein the lyotrope, the acid pH-causing proton, is consumed by the buffer during the pH raising step when the dessert product of that patent is prepared.

Additional amounts of gelatin and/or lyotrope can be added during the dilution step to alter the hydrolyzed collagen-to-lyotrope ratio so long as that ratio remains within the above-stated range. More particularly preferred ranges for this hydrolyzed collagen-to-lyotrope weight ratio will be described hereinafter.

As can be seen from examination of the plots of the graphs of FIGS. 2 and 3, where gelatin was used, the Bloom value of the gelatin selected for use in a concentrate plays a role in determining the gel-set temperature of the concentrate, and in selecting the gelatin or hydrolyzed collagen-to-lyotrope weight ratio. It is generally preferred to use more lyotrope with hydrolyzed collagens having higher Bloom or jelly values.

In FIG. 2, gel-set temperatures are plotted for 100 and 300 Bloom gelatin concentrates wherein the gelatin concentration is a constant 22 weight percent of the aqueous concentrate and the weight of urea as non-acid lyotrope is changed from zero through about 1.25 times the amount of gelatin present in the concentrate. While the decreases in gel-set temperatures are approximately the same for a given weight ratio of gelatin-to-urea, the gelatin with the Bloom value of 100 exhibits a gel-set temperature which is consistently about 9° C. lower than the gel-set temperature for the gelatin having a Bloom value of 300, for the range shown in the graph.

In FIG. 3, the amount of gelatin is kept constant at 22.5 weight percent as is the weight ratio of gelatin-to-urea kept at 1:0.955, while the gel-set temperature is plotted against the Bloom value of the gelatin utilized in the concentrate. Here again, the higher Bloom values go hand-in-hand with the higher gel-set temperatures for the amount of gelatin and gelatin-to-urea weight ratio used. As another example of the effect of concentration and Bloom or jelly value on the concentrates useful herein, a pourable, liquid concentrate can be prepared containing a lyotrope and up to about 60 weight percent gelatin having a Bloom value of about 100, while a concentrate containing the same amount of the same lyotrope with about 50 weight percent of 250 Bloom gelatin is very viscous and difficult to pour.

The pH value of the concentrate and of the diluted composition affect the gel-set temperature of the concentrate and the gel strength of the gelled, diluted composition. This is shown in FIGS. 4 and 5 for gelatin-containing concentrates and diluted compositions, respectively, which contain urea or calcium chloride as the lyotropic agent.

In FIG. 4, it is seen that increasing the pH value above about pH 4.2 for aqueous concentrates containing 22.5 weight percent gelatin (310 Bloom), and a gelatin-to-lyotrope (urea) weight ratio of 1:0.996, steadily increases the gel-set temperature. For the compositions containing 30.4 weight percent gelatin (280 Bloom) and a gelatin-to-calcium chloride weight ratio of 1:0.46, an almost linear increase in gel-set temperature is noted with increasing pH value. FIG. 5 shows that increasing the pH value of the concentrates of FIG. 4 which have been diluted one volume to ten volumes (2.25 and 3.04 weight percents gelatin, respectively), and therefore the diluted compositions, increases the gel strength of the gelled product to a point at which the gel strength levels to a relatively constant value.

It is thus seen that, for best results, there is some benefit in controlling the pH value for both the concentrates and diluted compositions. The pH value in general, is preferably below about pH 6 in the concentrate so that the composition maintains its low gel-set temperature. The pH value of the diluted composition is generally preferred to be below about pH 5.5 so that some control of the diluted composition's gel strength can be exercised. While useful concentrates and diluted, gelled products can also be prepared within the entire range of pH values from about 2.5 to about 7, it is preferred that the pH value of both the concentrate and diluted composition be between about 3.5 and about 5.5, as this pH value range helps to maintain stability of the composition to hydrolysis during storage at room temperature.

After preparation of the hydrolyzed collagen concentrate, it is diluted for use with an aqueous composition to a hydrolyzed collagen concentration of from about 0.25 to about 25 weight percent of the resulting, diluted composition. During the dilution step, a first volume of the concentrate is diluted with at least an equal volume of an aqueous composition. A dilution of about one volume of concentrate to a total of from about 2 volumes to about 200 volumes has been found to be a practical dilution for most uses, although dilutions up to a total of about 300 volumes, or more are also useful. The diluted composition thus produced preferably has a higher gel-set temperature than does the concentrate, and when maintained for a sufficient time at a temperature not higher than its gel-set temperature, the diluted composition forms a gel.

The concentrates of this invention have several uses as has already been mentioned. These uses fall broadly into two categories, uses for comestible products where gelatin is utilized, and for industrial uses where either gelatin or glue can be utilized.

The comestible or food product concentrates preferably contain water, from about 10 to about 30 weight percent gelatin, and have a gelatin-to-edible lyotrope weight ratio of about 1:0.3 to about 1:1.5. The concentrates for edible consumption can have a pH value range of about 2.5 to about 7, and this range is preferably from about 3.5 to about 5.5. The diluted, gelled comestible products more preferably have a pH value of about 3.5 to about 5.5. Most preferably, the concentrate and diluted, gelled product have pH values of about 4 to about 5.

The comestible product concentrates and therefore comestible products made therefrom, can be prepared from gelatins having a Bloom strength of from about 100 to about 350, but are preferably prepared from gelatin having a Bloom strength of from about 250 to about 300. Gelatins having Bloom values between about 100 and about 250 are usually preferred for use in those products containing up to about 15 weight percent gelatin.

After dilution, the comestible product preferably contains from about 0.25 to about 15 weight percent gelatin based upon the total weight of product, and more preferably about 0.4 to about 3.5 weight percent gelatin.

For comestible products, the lyotrope and hydrolyzed collagen should be edible; i.e. gelatin should be used. The preferred non-acid lyotropes for comestible uses are urea, biuret, calcium chloride and mixtures thereof; urea being most preferred as it addes substantially no taste to the products. When urea is the sole lyotrope, the gelatin-to-edible lyotrope weight ratio in the comestible product embodiments of this invention is more preferably from about 1:0.6 to about 1:1.1.

Food acids, such as citric acid, malic acid, fumaric acid, hydrochloric acid and the like, are useful herein to help provide the desired concentrate and diluted product pH values, and more importantly, as flavorants. The amount of food acid so utilized is typically less than about 20 percent of the weight of the gelatin present and less than about 10 percent of the weight of the concentrate. At such concentrations, food acids provide little, if any, lyotropicity.

While it is preferred that the concentrate have a pH value of about 3.5 to about 5.5 so that room temperature stability toward hydrolysis can be maintained, the concentrates of this invention can also have pH values as low as about 2.5. Upon dilution of the latter, low pH value, concentrates with an aqueous composition for use in a food product, the pH value of the diluted composition is preferably adjusted upward by admixing therewith an appropriate edible, alkaline material to a pH value preferably between about 3.5 and about 5.5, and more preferably to a pH value of between about 4 and about 5.

Alkaline materials useful for raising the pH values of the diluted compositions are water-soluble alkaline materials which are edible or which produce edible salts when admixed with the gelatin concentrate, including constituents of the concentrate such as food acids, and include sodium or potassium hydroxides, carbonates, bicarbonates, and phosphates, such as sodium dihydrogen phosphate, dipotassium hydrogen phosphate and trisodium phosphate, and the like, and mixtures thereof. Since the concentrates of this invention do not contain sufficient amounts of food acid to cause lyotropicity, the metallic taste observed from neutralized gelatin syrups in which food acids are the lyotrope, is not observed herein.

When sodium or potassium carbonates or bicarbonates are added to the acidic, gelatin-containing concentrates during the dilution step, the diluted composition emits bubbles of carbon dioxide due to the reaction of the acid and carbonate or bicarbonate salt. If the diluted composition is gelled quickly, as when cold water is used for the dilution step, and/or the diluted composition is refrigerated rapidly, the carbon dioxide gas bubbles can be trapped in the gelled, diluted composition to prepare a foamed, gelled food product whose bubbles contain a higher concentration of carbon dioxide than is present in the air, and which does not require beating and air entrapment to prepare a foam.

The natural buffering effect of food acid and food acid salts present on dilution tends to keep the pH value of the diluted compositions within the preferred range of pH values with most ordinary tap waters. Additional buffering agents such as sodium dihydrogen phosphate and disodium hydrogen phosphate can also be used to assist in buffering the concentrates and diluted compositions.

The aqueous gelatin concentrates of this invention, when used for dessert-type gelled food products, are more preferably diluted to a gelatin concentration of about 1 to about 5 weight percent, and more preferably to about 1 to about 3.5 weight percent of the total composition. Concentrates for preparing dessert-type gelled food products also typically contain natural or artificial fruit or berry flavorants such as strawberry, raspberry, orange, lime or grape concentrates, or the like, in sufficient amounts to flavor the gelled food product. When fruit or berry flavorants are used, an edible food colorant such as is normally associated with the fruit or berry is also typically present, e.g. red for raspberry or green for lime flavor. As previously discussed, food acids such as fumaric acid, citric acid, adipic acid, and the like which provide tartness and buffering capacity are present in the dessert compositions of this invention alone or in mixtures, at a concentration of about 1 to about 10 weight percent of the concentrate.

Natural or synthetic sweeteners such as sucrose, fructose, mannitol, sorbitol or saccharin derivatives, such as sodium sacchararin, sodium cyclamate and aspartame are also preferably present. The sweeteners can also be used alone or in mixtures in an amount sufficient to provide the desired sweetening effect. Food preservatives such as sodium benzoate and potassium sorbate can also be present in the gelatin-containing concentrates of this invention.

When natural sweeteners are used, the gelatin concentrates of this invention are most conveniently utilized in gelled food precursor products comprised of at least two packages or containers; one package containing the gelatin concentrate prepared from water, gelatin, edible lyotropic agent, and the like, with the second package containing an aqueous natural sweetener concentrate, such as a 65 weight percent solution of sucrose or a 90 weight percent solution of fructose.

The two package system for this type of gelled food product precursor is preferred because inclusion of the desired amount of natural sweetener in the concentrate frequently leads to a thickened, but ungelled, concentrate which is not very fluid. As is well known, natural sweeteners differ in their sweetening abilities, solubilities and viscosities, and consequently, the amount of sweetener in the natural sweetener-containing concentrate will vary as to the particular natural sweetener used. The amount of aqueous natural sweetener in the aqueous natural sweetener-containing concentrate is therefore that amount which, upon dilution, sufficiently sweetens the diluted composition and gelled product.

The separate package for the aqueous natural sweetener-containing concentrate can also contain, mixed therein, the alkaline material used to raise the pH value of diluted compositions, as when food acids are utilized to impart tartness and/or provide acid for a foamed product. In preferred practice, monosaccharides, such as glucose, are not used in conjunction with the alkaline material because their admixture causes an undesirable reaction which leads to a reduction in sweetening power. The sweetener-containing package can also contain a food acid to lower the pH value of the diluted composition.

In those instances where an artificial sweetener, such as aspartame or sodium saccharin, is used in the presence of food acid, the first package can contain water, gelatin, urea, food acid and artificial sweetener, while the second package can contain an aqueous solution of edible alkaline material. If desired, additional packages containing other gelled food product constituents, such as another food acid or flavorant can also be used. With artifical sweeteners, all components can be housed in a single package.

When the food product gelatin-containing concentrate of this invention is housed in one container, such as a bottle, and at least one other product constituent is housed in at least one other container, such as another bottle, the hereinbefore given weight percentages of the concentrate components are calculated based upon the weight of the contents of the gelatin-containing container. The amount of gelatin in the diluted composition in its liquid and gelled forms in calculated based upon the total weight of the total, diluted, composition.

When the desired gelled food product is an aspic, rather than a dessert, the food acid and sweetener are not used. Instead, a package, or packages, other than that containing the gelatin concentrate can contain one or more flavoring materials suitable for aspics, such as tomato juice or concentrate, beef broth, clam broth, and table salt. The flavorant for the aspic can also be packaged with the gelatin concentrate.

One convenient form for packaging one, two or multi-package food product precursors of this invention is in heat-sealable, plastic, foil laminate or plastic lined, flexible envelopes. These envelopes are conveniently used by clipping off a corner or tearing the seal open and squeezing or pouring out the premeasured contents.

Using a dessert-type product precursor as exemplary, after opening and emptying the package contents into a bowl, admixing the gelatin concentrate and the aqueous natural sweetener-containing concentrate partially dilutes the gelatin concentrate. The package contents are mixed with sufficient water to obtain the diluted gelatin concentration desired for the gelled food product, as described previously. Admixture of the aqueous natural sweetener-containing concentrate and the gelatin-containing concentrate preferably occurs prior to admixture with water to form the diluted composition. However, the gelatin concentrate and water can be admixed first, followed by admixture of the natural sweetener-containing concentrate. Gelation is then allowed to occur, as by refrigeration.

This invention, as explained before, eliminates the need for hot water dissolution of solid gelatin when gelatin desserts are prepared and thus shortens the cooling time necessary to reach gelation temperatures after the dessert preparation is put into a refrigerator. Through the use of this invention, it is possible to dilute a concentrate shortly before dinner and have a gelled product after dinner.

Other comestible products, such as foods like candies, dairy products, meat products and non-food products like capsules for medicaments, can also be prepared using the gelatin-containing concentrates and methods of this invention. While the gelatin within these comestible products is in a gelled state, the product itself need not be in a gelled state as is the case of marshmellows and ice milks. Gelled products, such as medicament capsules, head cheese, canned hams and the like, are preferred herein.

Candies, such as marshallows, typically contain about 1.4 to about 2 weight percent gelatin in the total candy along with flavoring agents such as sweeteners and/or berry or fruit flavors. Similarly, meat-containing products, such as head cheeses and jellied meat loaves, e.g. corned beef loaf and canned hams, which contain meat products, spices, gelatin and water, typically contain about 2 to about 3 weight percent gelatin based upon the total weight of the product. Ice milks are illustrative dairy products which can be made using the methods and concentrates of this invention. Ice milks typically contain about 30–35 percent solids by weight, including about 0.4 to about 0.5 weight percent gelatin, a sweetener, other flavorants such as chocolate, vanilla, fruit or berry flavors, nuts and the like. Gelatin-containing capsules for medicaments can also be prepared using the concentrates of this invention.

Each of the above, illustrative, gelatin-containing comestible products can be prepared by replacing the gelatin and part of the water normally used for preparation of the product with a concentrate of this invention and diluting the concentrate by the process of this invention so that a product is formed at the desired, final gelatin concentration. Thus, a suitable gelatin concentrate useful herein for edible products is provided as are the remaining product ingredients. The gelatin concentrate is admixed with the remaining product components and with at least an equal volume of an aqueous composition to dilute the concentrate and to provide the desired gelatin concentration, e.g. about 0.25 to about 15 weight percent of the total composition.

Dilution of the gelatin concentrate can occur prior to admixture as where marshmallows are made. Admixture of the concentrate with the remaining product components can also precede dilution as where a gelatin concentrate is added to meat, such as a ham, to be cooked in its container, such as a can or sausage casing, wherein the cooking process causes exudation of aqueous juices from the meat to effect the dilution step. Admixture and dilution can also occur substantially simultaneously as when ice milks are prepared.

The concentrates of this invention are also used for coating substrates in many industrial uses. For use as a coating, a hydrolyzed collagen concentrate of this invention is first provided which contains an aqueous solution having from about 10 to about 60 weight percent hydrolyzed collagen, a non-acid lyotrope, and has a HC:L weight ratio of about 1:0.1 to about 1:4.5. While the pH values of the concentrates and diluted compositions of this embodiment can be between about 2.5 and 7, and are preferably between about 3.5 and 5.5, the pH value of the concentrates and diluted compositions are more preferably from about 4 to about 5. The preferred gelatin Bloom values for the concentrates of this embodiment are from about 100 to about 275, with while the preferred glue jelly values are from about 200 to about 550.

A concentrate for coating use is diluted to a hydrolyzed collagen concentration between about 0.25 and 25 weight percent as is desired for the particular use. Prior to gelation of the diluted composition, it is applied to the surface of a substrate to form a coating thereon, and the coating is maintained in contact with the substrate surface at a temperature below the gel-set temperature of the diluted composition for a time sufficient to form a gel on the surface.

The substrate coating so provided can be continuous, as in the case of a photographic film subbing, or discontinuous, as can occur in dust control uses. In some uses, the gelled coating can be dehydrated, as by heat or an air current flowing upon it, to form a film on the substrate surface. When dehydrated, or dried, the hydrolyzed collagen films are stable to the changes in temperature which would cause their precursor concentrates or diluted compositions to gel and/or melt. These dried films are also relatively stable to water because of the normally encountered difficulty in dissolving hydrolyzed collagen discussed previously.

Since the concentrates and diluted, gelled products of this embodiment are not intended for consumption, any of the before-described non-acid lyotropes can be used. However, calcium chloride and calcium chloride-urea mixtures are preferred as lyotropic agents.

As stated hereinbefore, the preferred hydrolyzed collagen-to-lyotrope weight ratio for the industrially used concentrates, including those having gel-set temperatures below about 0° C., is from about 1:0.1 to about 1:4.5. This ratio is more preferably from about 1:0.3 to about 1:1.5, and most preferably from about 1:0.3 to about 1:1 for single lyotropic agents, such as calcium chloride. When the mixed calcium chloride-urea lyotrope is used, the HC:L weight ratio is more preferably from about 1:1 to about 1:4.5, and most preferably from about 1:2 to about 1:4. It is preferred to use hydrolyzed collagen prepared by the action of hydrochloric acid in conjunction with a calcium chloride lyotope as the use of a material produced by sulfuric acid hydrolysis can lead to the precipitation of calcium sulfate, which is not desirable.

The concentrates of this embodiment are typically used as a convenient form of hydrolyzed collagen in the preparation of thin film subbings which contain a photoactive agent, such as a silver salt. When so used, the manufacturer of the photoactive product, such as photographic film, need not incur the capital and energy expenses required for preparing large volumes diluted gelatin compositions from dried hydrolyzed collagen. Rather, the user need only purchase the concentrate and dilute it with water and any other ingredients, such as a photoactive agent, as use requires, and coat the photographic film precursor sheet (e.g. cellulose acetate) following an otherwise usual practice.

In photographic film subbing uses, the diluted compositions typically contain about 10 to about 25 weight percent hydrolyzed collagen having a jelly value of about 200 to about 300, or a Bloom value of about 100 to about 150. For use in subbings, the diluted compositions typically range from about 2 to about 6 times the volume of the concentrate from which they are prepared.

In other industrial uses, such as for paper sizing, diluted hydrolyzed collagen compositions preferably contain about 0.5 to about 3.5 weight percent hydrolyzed collagen having a jelly value of about 400 to about 500, or a Bloom value of about 200 to about 250. In these uses, the concentrate is diluted to about 3 to about 300 times its original volume in the preparation of the diluted composition.

It is thus seen that the concentrates of this invention can be usefully diluted to from about 2 to about 300 times their original volume in coating uses.

As pointed out previously, hydrolyzed collagen gels of similar firmness can be prepared from differing amounts of hydrolyzed collagens having differing Bloom or jelly values. Consequently, subbings can be prepared using a lesser amount of a hydrolyzed collagen having a higher jelly or Bloom value than those disclosed hereinabove, while a sizing can be prepared from a greater amount of hydrolyzed collagen having a lower Bloom or jelly value.

To prepare a photographic film subbing, as well as paper sizing or other industrially useful gel, a concentrate of this invention is provided as previously discussed, diluted to the desired hydrolyzed collagen concentration with at least an equal volume of aqueous composition, and then applied to coat the substrate as would a normally prepared hydrolyzed collagen solution, e.g., by spray or roller. For a subbing or paper sizing, the diluted composition is typically applied over a generally flat, planar substrate as a coating, and maintained at a temperature not higher than its gel-set temperature for a period of time sufficient to produce a gel.

Another known industrial coating use for diluted hydrolyzed collagen solutions is in controlling the escape of dust particles from dust laden surfaces as are frequently found on roads, in mining operations, and in coal and other mineral transporting and handling operations. The concentrates and diluted compositions described herein are particularly useful in a method of controlling the escape of dust.

For dust control, an ungelled, aqueous concentrate containing from about 10 to about 40 weight percent hydrolyzed collagen and a non-acid lyotropic agent, such as calcium chloride or calcium chloride-urea is prepared; the weight ratio of hydrolyzed collagen-to-lyotrope (HC:L) preferably being from about 1:0.3 to about 1:4.5. When calcium chloride, alone, is used as the lyotropic agent, the more preferred HC:L weight ratio is from about 1:0.3 to about 1:1.5, and most preferably is from about 1:0.3 to about 1:1. When a mixed calcium chloride-urea lyotrope is utilized, the HC:L weight ratio is more preferably from about 1:1 to about 1:4.5, and most preferably from about 1:2 to about 1:4. Using the preferred HC:L weight ratios, the concentrates of this embodiment have gel-set temperatures below the freezing point of water (0° C.).

The concentrate is diluted with water to a hydrolyzed collagen concentration of between about 0.5 and about 3.5 weight percent to provide a diluted composition whose gel set temperature is above about 0° C. and is preferably above about 5° C. These concentrates typically have pH values of about 4 to about 5 and are preferably prepared from gelatins having a Bloom strength of from about 100 to about 300, or glues having a jelly value of from about 200 to about 600.

Prior to the gelling of the diluted composition, it is applied, as by spraying, over a dust laden surface of a substrate such as a road, coal pile in a coal car or an ore pile in an ore-carrying railroad car. The diluted composition is then maintained in contact with the dust laden surface at a temperature below its gel-set temperature for a time sufficient to form a gel which can subsequently dehydrate to form a film on the dust laden surface.

By applying the gel-forming, diluted composition to a coal or ore pile prior to shipment, and allowing gelation to occur, surface dust particles are entrapped in the gel and/or film and have less tendency to escape during transport. This form of dust control provides cleaner streets and railroad rights of way and help to assure more product reaching its market without incurring a substantial cost or significantly contaminating the dusty product.

Furthermore, a concentrate for this use, such as gelatin Concentrate F of FIG. 1 which remains liquid down to a temperature of about $-20°$ F., is ideal for wintertime use since it can be stored outside, ready for use, with little concern about its gelling, and since a hydrolyzed collagen gel does not readily dissolve in cold water, rain and snow do little to reduce the dust controlling effect after such a solution is allowed to gel on a dust-laden surface.

In addition, calcium chloride-containing gels tend to be hygroscopic and flexible so that if the gel surface breaks prior to dehydration and film formation, the hygroscopic gel can flow to repair the break. Furthermore, because of its tacky nature, the hygroscopic gel tends to entrap dust particles escaping through the break, thereby also offerng a self-repairing feature. Calcium chloride also provides the gel and subsequently formed coating film with their own bacteriostat so that additives for that purpose are not needed.

For dilution of all of the concentrates discussed hereinbefore, the temperature of the aqueous composition used for dilution can range from cold through hot. Cold water generally requires more stirring to effect formation of a substantially homogeneous diluted composition, and the composition so produced requires a relatively short time to gel. When hot water is used, the stirring time is shortened, but more time is required for cooling to gelation temperatures to occur. In preferred practice, tepid water is used when the shortest gelling time is not essential.

The concentrate compositions of this invention can be prepared from dried hydrolyzed collagen or from hydrolyzed collagen liquors. In a typical preparation, 250-300 Bloom gelatin liquor containing 29-32 weight percent solids at a temperature of 160° F. (about 71° C.) is added to a Dopp Kettle or equivalent mixer. A non-acid lyotrope, such as urea, in the desired amount, and other ingredients are then added thereto and mixed in slowly while the temperature of the resulting admixture is maintained at about 140-150° F. (about 60-65.5° C.). After the principal ingredients have been dissolved, the pH value of the composition is adjusted, if necessary. The admixture is then cooled to about ambient temperature (20-25° C.) and filled into suitable containers.

To prepare a preferred gelled comestible product according to the method of this invention, an illustrative concentrate is provided, such as the one above, or any other ungelled concentrate, having a gel-set temperature less than about 20° C., comprising water, about 10 to about 30 weight percent gelatin and an edible lyotropic agent and having a pH value of about 3.5 to about 5.5 and a gelatin-to-lyotropic agent weight ratio of about 1:0.3 to about 1:1.5. A first volume of the concentrate is then diluted with at least an equal volume of water to provide a composition having a gelatin concentration of about 0.25 to about 15 weight percent of the total weight of the food product. The dilution is more preferably carried out by diluting one volume of concentrate to a total of from about 3 to about 120 volumes of diluted composition. The diluted composition is thereafter maintained at a temperature of less than its gel-set temperature, e.g. less than about 20° C., to form a gel. If the diluted composition its cool or cold when prepared, it normally takes only a short time for gelation to take place, especially when the composition is placed in a refrigerator.

This invention is further illustrated by the examples which follow.

Best Mode For Carrying Out The Invention

Gelatin Dessert Concentrate

EXAMPLE 1

With Artificial Sweetener

|   | Component List | Weight Percent |
|---|---|---|
| 1 | Water | 42.7 |
| 2 | Gelatin-HCl, 250 Bloom (95% solids) | 26.4 |
| 3 | Urea (98% solids) | 18.9 |
| 4 | Fumaric acid | 4.0 |
| 5 | Sodium citrate | 1.8 |
| 6 | Sodium benzoate | 0.05 |
| 7 | Potassium sorbate | 0.05 |
| 8 | Strawberry flavor concentrate | 1.4 |
| 9 | Red food color | 1.4 |
| 10 | Sodium hydroxide (as 25% solution) | 3.0 |
| 11 | Saccharin solids | 0.3 |
|   |   | 100.0 |

The components numbered 2–7 in the above list were first blended together while dry. The components numbered 8 and 9, which are liquids, were thereafter admixed and blended with the dry blend of components 2–7 to form a new blend. Water (component 1) was thereafter admixed with agitation to the new blend and the resulting concentrate was heated with continued agitation to about 140° F. (60° C.) Agitation was continued with maintenance of a temperature of about 140° F. (60° C.) until a substantially homogeneous concentrate was prepared. Sodium hydroxide (component 10) was thereafter added to adjust the pH value of the concentrate and the saccharin solids, dissolved in water (component 11) was added and mixed into the composition. The amount of water noted in the above Component List is that which was added as water and does not include that water which may be contained in one of the other components, e.g., gelatin, urea, flavor concentrate, etc.

After cooling, the aqueous gelatin concentrate had a pH value of 4.5, and had a gel-set temperature of 10° C. Dilution and mixing of one volume of the concentrate to ten volumes with City of Chicago tap water produced a gelatin dessert composition which had a gel-set temperature of 13.5° C.

EXAMPLE 2

Gelatin Concentrate

A gelatin concentrate useful in the process of this invention was prepared as follows: A gelatin liquor (75.3 pounds) containing 29.77 weight percent 280

Bloom gelatin-HCl was mixed with urea (22.0 pounds at 98% purity) at a temperature of 65° C. The pH value of the composition was 4.3, and a total of 2.7 pounds of additional water were added with mixing to form a substantially homogeneous concentrate.

The concentrate so produced contained 22.4 weight percent gelatin and had a gelatin-to-urea weight ratio of 1:0.96. This concentrate had a gel-set temperature of 8° C. When diluted to contain 2.24 weight percent gelatin, the diluted and subsequently mixed composition had a gel-set temperaure of 14° C.

TWO PACKAGE CONCENTRATE

EXAMPLE 3

Containing Natural Sweetener

| | Component List | Weight Percent |
|---|---|---|
| | First Solution | |
| 1 | Water | 43.55 |
| 2 | Gelatin-HCl, 250 Bloom (95% solids) | 28.0 |
| 3 | Urea (98% solids) | 20.0 |
| 4 | Fumaric acid | 1.7 |
| 5 | Citric acid | 2.0 |
| 6 | Sodium citrate (85% solids) | 2.5 |
| 7 | Sodium benzoate | 0.05 |
| 8 | Potassium sorbate | 0.05 |
| 9 | Strawberry flavor concentrate | 1.3 |
| 10 | Red food color | 0.85 |
| | | 100.0 |
| | Second Solution | |
| | Sucrose, 65% aqueous | |

The concentrate portion of the first package was prepared as described in Example 1. This composition had a pH value of 3.9-4.0, had a gel-set temperaure of 55° F. (12.5° C.), and a gelatin-to-urea weight ratio of 1:0.74.

30 Grams of the first solution were packaged as were 56 grams of the second solution. The packages were opened and their contents poured into a measuring cup to yield 28.5 grams and 55.0 grams, respectively. Sufficient tepid tap water (166.5 grams) was added with stirring to prepare one cup of liquid (250 grams, total). The resulting diluted composition had a gel-set temperature of 61° F. (16.1° C.) and a pH value of 4.0.

A similar orange flavored concentrate was prepared by replacing the strawberry flavor concentrate and red food color with 1.8 weight percent orange flavor and 0.85 percent of orange food color, respectively. A total of 43.05 weight percent added water was used. This composition had the same gel-sel and pH values as described above.

A two package gelled food product was prepared using a 90% aqueous fructose solution as the sweetener. For this product, a package containing 40 grams of the fructose solution was poured into the measuring cup and yielded 39.2 grams. Another package containing 30 grams of the first solution was prepared and emptied into the cup to yield 28.5 grams. Thereafter, a total of 182.3 grams of tepid tap water were added to bring the diluted composition to one cup (250 grams, total). This diluted composition also had a pH value of 4.0 and gel-set temperature of 61° F. (16.1° C.).

All of the above gelled products were eaten, and could not be distinguished in taste or gel characteristics from similar products prepared from dried gelatin.

EXAMPLE 4

Gelatin Concentrates and Compositions From FIGS. 4 and 5

The concentrates containing gelatin and urea whose gel-set temperatures as a function of pH are illustrated in FIG. 4 also contained small amounts of fumaric acid and sodium citrate as a pH adjusting buffer system and to impart tartness to the diluted, gelled dessert-type product. The buffer system components used to prepare the concentrates whose gel-set temperatures correspond to the points of the graph of FIG. 4 are shown in Table 1 below. Gel strength values for the diluted compositions, prepared from the concentrates, illustrated in FIG. 5, are listed in Table 2 as are the gel-set temperatures and taste characteristics for these diluted compositions.

TABLE 1*

| Compositions Containing 22.5 Percent Gelatin and 22.4 Percent Urea | | | | |
|---|---|---|---|---|
| Concentrate | Fumaric Acid | Sodium Citrate | pH | Gel-Set Temp. (°C.) |
| 1 | 2.0 | 0 | 3.25 | 10–12 |
| 2 | 2.0 | 1.0 | 3.6 | 10–12 |
| 3 | 2.0 | 1.5 | 3.8 | 10–12 |
| 4 | 2.0 | 2.0 | 4.1 | 10–12 |
| 5 | 2.0 | 2.5 | 4.2 | 10–12 |
| 6 | 1.0 | 1.0 | 4.3 | 12–14 |
| 7 | 1.0 | 2.0 | 4.7 | 13–15 |
| 8 | 0 | 2.0 | 5.7 | 15–18 |

*The amounts of fumaric acid and sodium citrate are given in weight percentages based on the total weight of the concentrates.

TABLE 2**

| Proportion Of Diluted Compositions Prepared From Table 1 Concentrates | | | |
|---|---|---|---|
| Diluted Concentrate | pH | Gel Strength Value | Taste |
| 1 | 3.25 | 28 | Acid |
| 2 | 3.6 | 32 | Acid |
| 3 | 3.8 | 34 | Bitter |
| 4 | 4.1 | 38 | Bitter |
| 5 | 4.2 | 38 | Bitter |
| 6 | 4.3 | 39–40 | Tartness fading |
| 7 | 4.7 | 40 | Slightly tart |
| 8 | 5.7 | 40 | Alkaline |

**The concentrates were diluted one volume to ten volumes to provide 2.25 weight percent gelatin in the diluted composition.

EXAMPLE 5

Gelatin Concentrates and Compositions for Dust Control

A series of five concentrates (5A-5E) and five compositions diluted one volume to ten volumes were prepared therefrom, all having gel-set temperatures substantially similar to those of concentrate F and diluted composition F/10 of FIG. 1. The components and amounts thereof for each concentrate are listed in Table 3, below. The general technique utilized in Example 1 was followed for the preparation of the concentrate.

TABLE 3

| Gelatin Concentrates For Dust Control Weight Percent in Each Concentrate | | | | | |
|---|---|---|---|---|---|
| Component List | 5A | 5B | 5C | 5D | 5E |
| Gelatin - HCl (Bloom value) | 12.7 (300) | 12.7 (300) | 12.7 (100) | 12.7 (280) | 16 (100) |

TABLE 3-continued

Gelatin Concentrates For Dust Control
Weight Percent in Each Concentrate

| Component List | 5A | 5B | 5C | 5D | 5E |
|---|---|---|---|---|---|
| Urea (98% solids) | 25.0 | 25.0 | 25.0 | 25.0 | 25.0 |
| Calcium chloride (95% solids) | 25.4 | 25.4 | 25.4 | 25.4 | 25 |
| Water | 36.9 | 36.9 | 36.9 | 36.9 | 36.4 |
|  | 100.0 | 100.0 | 100.0 | 100.0 | 100.0 |
| Concentrate pH value | 4.7 | 4.9 | 4.5 | 4.1 | 3.4 |

Each concentrate so prepared had a gel-set temperature of less than about −20° F. Upon dilution and mixing of one volume of concentrate to 10 volumes, the resulting diluted composition had a gel-set temperature of about 40° F.

Comparison of the pH values for the compositions of Table 3 illustrates the variability in pH value obtained when substantially identical concentrates were prepared, e.g., 5A vs. 5B, as well as the effects obtained when different amounts of gelatins having different Bloom values were used to prepare the concentrates, e.g. 5C vs. 5E.

The diluted composition prepared from concentrate 5A, while still liquid, was sprayed over a pile of metal-lurigical coal in an amount sufficient to generously cover the surface of the pile, and allowed to gel. Metal-lurgical coal contains a relatively large amount of coal dust or fines, such as those which will pass through a 100 Tyler mesh sieve. The gel-covered coal pile was then subjected to an air current supplied by a room fan directed at the pile and also a regular vibration using a commercially available laboratory vibrator.

After several days of continuous air current and vibrational treatments, at ambient room temperature, the resulting gelatin film appeared to be unbroken. No coal dust evolution was noted during the period in which the gelled gelatin covered coal pile was subjected to the air current and/or vibration.

This demonstration also illustrates the previously discussed fact that the gel-set and melting temperatures for gelled, diluted compositions are different. Thus, the gel-set temperature for the diluted composition was about 40° F. while the ambient air temperaure around the coal pile for several days was about 70° F., and the gelled composition was not observed to melt and return to a liquid, sol, state.

EXAMPLE 6

Glue Concentrate

A concentrate for industrial uses in the process of this invention was prepared using glue as the hydrolyzed collagen source. The concentrate was prepared generally as described in Example 1 from the following components:

| Component List | Weight Percent |
|---|---|
| Bone glue, 220 gram jelly value | 33 |
| Urea | 12 |
| Water | 55 |
|  | 100.00 |

The composition so prepared had a pH value of 4.5, a glue-to-lyotrope (urea) weight ratio of 1:0.36, and gel-set temperature of 45° F. (about 7.2° C.). Upon dilution of one volume of concentrate to a total of 10 volumes with tepid water, the diluted composition had a gel-set temperature of 50° F. (10° C.).

EXAMPLE 7

Further Two Package Dessert-Type Gelled Food Products

Two additional two package, gelled dessert-type food product precursors (Products A and B) for the preparation of products similar to that of Example 3 were prepared as follows:

|  | Component List | Products A | (Weight Percent) B |
|---|---|---|---|
|  | First Solution |  |  |
| 1 | Gelatin HCl, 250 Bloom | 26 | 25.74 |
| 2 | Urea | 25 | 20.80 |
| 3 | Sodium benzoate | 0.05 | 0.05 |
| 4 | Potassium sorbate | 0.05 | 0.05 |
| 5 | Sodium citrate (85% active) | — | 2.18 |
| 6 | Strawberry flavor concentrate | — | 0.69 |
| 7 | Strawberry flavor concentrate | — | 0.49 |
| 8 | Water | 48.9 | 50.00 |
|  |  | 100.00 | 100.00 |
|  | pH | 4.9 | 5.8 |
|  | Second Solution |  |  |
| 9 | Sucrose (granular) | 66.00 | 66.00 |
| 10 | Citric acid | 0.53 | 0.53 |
| 11 | Malic acid | 0.47 | 0.47 |
| 12 | Sodium citrate (85% active) | 0.65 | — |
| 13 | Strawberry flavor concentrate | 0.21 | — |
| 14 | Strawberry color concentrate | 0.15 | — |
| 15 | Water | 31.99 | 33.00 |
|  |  | 100.00 | 100.00 |
|  | pH | 4.1 | 2.5 |

The First Solution for each gelled product precursor was prepared by adding the requisite amount of water to the dry ingredients (components 3–5), followed by heating with agitation to about 60° C. The heated admixture was then agitated until substantially homogeneous and all of the ingredients had dissolved. The resulting solution was cooled with agitation to about room temperature and the coloring and flavorant admixed (Product B). Entrapped air bubbles were removed during the cooling step. The cooled solutions were then sealed in individual pouches, each containing 17.5 grams of the First Solution. The gel-set temperature for the First Solution of Product A was 62° F., while that for Product B was 61° F.

The Second Solution for each gelled product precursor was prepared by adding all of the solid components (9–11, and 12 for Product A) to the water (component 15). The resulting admixture was heated with agitation to about 50–60° C. until all of the ingredients had dissolved and the solution was substantially homogeneous. The homogeneous solution was then cooled to ambient, room temperature. Components 13 ad 14 were added to the cooled Second Solution of Product A. Each of the Second Solutions was then sealed in an individual pouch at 60.0 grams per pouch.

Gelled food products were prepared by opening the individual pouches (First and Second Solutions) for each product, and mixing their contents with sufficient tepid water (172.5 grams) to make one cup of liquid.

The thus diluted Products A and B were then refrigerated to form gelled desserts. The gelled products had gel-set temperatures of 60° F.

The present invention has been described generally and with respect to preferred embodiments. It will be clear to those skilled in the art that modifications and/or variations of the disclosed methods and compositions may be made without departing from the scope of the invention set forth herein. The invention is defined by the claims which follow.

What is claimed is:

1. A method for coating a substrate with a hydrolyzed collagen gel comprising the steps of:
   providing first volume of an aqueous hydrolyzed collagen concentrate comprising water, from about 10 to about 60 weight percent hydrolyzed collagen and a non-acid lyotropic agent, the weight ratio of hydrolyzed collagen-to-non-acid lyotropic agent being about 1:0.1 to about 1:4.5, said concentrate having a gel-set temperature of less than about 20° C. and a pH value between about 2.5 and about 7;
   diluting said first volume of hydrolyzed collagen concentrate to from about 2 to about 300 times said first volume to a hydrolyzed collagen concentration of between about 0.5 and about 25 weight percent to provide a diluted composition having a gel-set temperature higher than that of said hydrolyzed collagen concentrate;
   applying said diluted composition, prior to gelation, to contact the surface of a substrate and form a coating thereon; and
   maintaining said applied, diluted composition in contact with said substrate surface at a temperature below the gel-set temperature of said diluted composition for a time sufficient to form a gel on said surface.

2. The method according to claim 1 wherein said non-acid lyotropic agent includes calcium chloride.

3. The method according to claim 2 wherein said substrate is a pile of coal or ore having a dust laden surface, and said method controls the escape of said dust therefrom.

4. The method according to claim 2 wherein said substrate is a photographic film precursor sheet and said method provides a subbing for photographic film.

5. The method according to claim 4 wherein said diluted composition comprises about 10 to about 25 percent by weight hydrolyzed collagen.

6. The method according to claim 2 wherein said substrate is paper and said method provides a sizing for said paper.

7. The method according to claim 6 wherein said diluted composition comprises about 0.5 to about 3.5 weight percent hydrolyzed collagen.

8. The method according to claim 1 wherein said lyotropic agent is calcium chloride and said hydrolyzed collagen-to-calcium chloride weight ratio is from about 1:0.3 to about 1:1.5.

9. The method according to claim 2 wherein said non-acid lyotropic agent additionally includes urea and said hydrolyzed collagen-to-non-acid lyotropic agent weight ratio is from about 1:1 to about 1:4.5

10. A method for controlling the escape of dust from a dust laden surface comprising the steps of:
    providing an aqueous hydrolyzed collagen concentrate comprising water, from about 10 to about 40 weight percent hydrolyzed collagen and a lyotropic agent, the weight ratio of hydrolyzed collagen-to-lyotropic agent being about 1:0.3 to about 1:4.5, said concentrate having a gel-set temperature of less than about 0° C. and a pH value between about 4 and about 6;
    diluting said hydrolyzed collagen concentrate to a hydrolyzed collagen concentration of between about 0.5 and about 3.5 weight percent to provie a diluted composition having a gel-set temperature higher than that of said hydrolyzed collagen concentrate;
    applying said diluted composition, prior to gelation, to contact the surface of a dust laden substrate; and
    maintaining said applied, diluted composition in contact with said substrate surface at a temperature below the gel-set temperature of said diluted composition for a time sufficient to form a gel on said surface.

11. The method according to claim 10 wherein said substrate is a pile of coal or ore.

12. The method according to claim 11 wherein said diluted composition is applied to said dust laden surface by spraying.

13. The method according to claim 10 including the additional step of dehydrating said gel on said dust laden surface into a film.

* * * * *

UNITED STATES PATENT AND TRADEMARK OFFICE
CERTIFICATE OF CORRECTION

PATENT NO. : 4,426,443

DATED : January 17, 1984

INVENTOR(S) : Joseph L. Shank

It is certified that error appears in the above-identified patent and that said Letters Patent is hereby corrected as shown below:

On the title page;

In the Abstract, lines 6 "1:0 of" should be deleted;

Column 9, line 65, "955" should be --995--;

Column 19, line 53, "gel-sel" should be --gel-set--.

Signed and Sealed this

Sixteenth Day of July 1985

[SEAL]

Attest:

DONALD J. QUIGG

Attesting Officer       Acting Commissioner of Patents and Trademarks